United States Patent Office 2,949,440
Patented Aug. 16, 1960

2,949,440

PREPARATION OF PIPERAZINE PHTHALAMIDE POLYMERS

Manfred Katz, Wilmington, Del., assignor to E. I. du Pont de Nemours and Company, Wilmington, Del., a corporation of Delaware No Drawing. Filed Nov. 28, 1956, Ser. No. 624,718

1 Claim. (Cl. 260—78)

This invention relates to condensation polymers and more particularly to novel soluble high-melting synthetic linear polymers characterized by the presence of recurring structural units containing amide linkages formed from piperazines and phthaloyl halides.

It is the object of this invention to provide a novel and useful high molecular weight polyamide which can be prepared in an amorphous, non-crystalline state and which is characterized by high melting point and ready solubility in simple volatile non-corrosive solvents and solvent mixtures. A further object is the preparation of heretofore unavailable polyamides derived from phthalic acid and its amide forming derivatives, characterized by high molecular weight and ready solubility in common volatile organic solvents. Another object is the preparation of fibers and filaments from such polymers. Other objects will appear hereinafter.

These objects are accomplished by the following invention which comprises a high molecular weight synthetic linear polyamide in which the polyamide chain contains a major amount of the structural unit

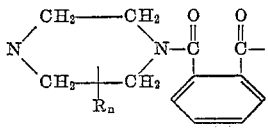

wherein R is a substituent for nuclear hydrogen and is lower alkyl and $n$ is an integer from 0 to 8 inclusive. By a "major amount" is meant that at least 50% of the structural units of the polyamide chain are piperazine phthalamide linkages. In the preferred embodiment of this invention the polyamide chain is composed solely of these structural units.

These phthalamides are soluble in the common volatile solvents such as chloroform, dimethylformamide, acetic acid, methylene chloride, 1,1,2-trichloroethane and methanolchloroform mixtures, and can readily be processed by conventional wet- or dry-spinning techniques (such as those practiced in the rayon and acetate industries) into strong, tough, abrasion resistant fibers with physical propertiees suitable for textile and industrial applications.

The polymers of this invention are obtained by the interfacial polymerization of piperazine, a C-lower alkyl substituted piperazine or mixtures thereof, with an organic dicarboxylic acid halide containing a major amount of a phthaloyl halide. When using the interfacial polymerization procedure of this invention the acid chlorides are preferred although the other acid halides may be employed if desired.

By the term "interfacial polymerization" is meant a technique wherein the reactants, i.e. the intermediates of the polymer, are brought together in such a manner that the reaction zone is at or immediately adjacent to a liquid-liquid interface and most of the molecules of at least one of the intermediates must diffuse through a liquid diluent to arrive at the reaction zone. This technique may be conveniently practiced in accordance with the teaching of the present invention by providing a liquid-liquid interface by mixing water in which the organic piperazine compound is dissolved or suspended with ether a water-immiscible liqud dicarboxylic acid halide (containing the phthaloyl halide) or the acid halide dissolved or suspended in a water-immiscible liquid until the desired condensation polymerization has occurred, and then, if desired, separating the resulting polyamide.

In mixing the water solution or suspension of the piperazine compound with the water-immiscible dicarboxylic acid halide phase, it is preferred that the addition of the one phase to the other be accompanied by sufficiently rapid stirring to produce an emulsion of fine particle size. Such emulsions may be equally well produced by other means, for example, by impinging two high velocity liquid streams upon each other in a suitable manner. When an emulsion of fine particle size is provided the available piperazine compound and/or the diacid halide is completely used up in a matter of a few seconds or, at most, in a matter of a few minutes, depending to an extent on the sum total of the reaction conditions.

The process for the preparation of these polyamides by interfacial polymerization can be carried out over a considerable range of temperatures from just above the freezing point of the phase having the highest freezing point up to temperatures at which decomposition products form to an objectionable extent. However, in view of the rapidity with which these fiber-forming polyamides are formed at moderate temperatures, there is no advantage in using temperatures higher than about 95° C., and it is preferred that the reaction be carried out in the moderate temperature range of −10° C. to 60° C.

The reactants used in this invention do not need to be employed in equivalent proportions. The excess of one reactant simply remains in the supernatant liquid from which the polyamides precipitate. It has been found that the process of interfacial polymerization of piperazine compounds with phthaloyl halides yields polyamides of high molecular weight whether one reactant is in excess by 300% or even more, or whether the reactants are in equivalent or nearly equivalent amounts. For purposes of economy, it is usually desirable to employ the reactants in equivalent or nearly equivalent amounts.

It is sometimes advantageous to employ an emulsifying agent to assist in suspending one liquid phase in the other. To this end, water or organic soluble emulsifying agents may be used. Examples of organic soluble agents are the alkali metal salts of the sulfates of alkyl alcohols of from 8 to 18 carbon atoms, the "Spans" (Atlas Powder Co., sorbitan mono fatty acid esters), the higher fatty alcohols, the higher fatty alcohol esters, "Naccolene F" (Allied Chem. & Dye Co., alkyl aryl sulfonate), "Acto 700" (Stanco Inc., sodium petroleum sulfonate), "Alkaterge C" (Commercial Solvents Corp., substituted oxazoline), "Betanols" (Beacon Co., high molecular weight esters), "Duponol OS" (Du Pont Co., higher alcohol derivative), etc.

In the aqueous phase, the emulsifying agents may be cationic, anionic or non-ionic. Representative examples of cationic emulsifying agents are "Lorol" pyridinium chloride ("Lorol" is the trademark of the Du Pont Co. for the mixture of aliphatic alcohols obtained by hydrogenation of coconut oil), "Triton K–60" (Rohm & Haas Co., cetyl dimethyl benzyl ammonium chloride), "Nopcogen 17L" (Nopco Chem. Co., a hydroxylated polyamide). Representative examples of non-ionic agents are the "Tweens" (Atlas Powder Co., polyoxyethylene derivatives or sorbitan monoesters of long-chain fatty acids), "Triton X-100" (Rohm & Haas Co., alkylated aryl polyether alcohol), the "Elvanols" (Du Pont Co., partially hydrolyzed polyvinyl acetates of various molecular weights), etc. and representative examples of the anoinic emulsifying agents are soaps, the amine salts, "Duponol WA" (Du Pont Co., alcohol sulfate), "Aerosol OT" (American Cyanamid Co., dioctyl ester of sodium sulfosuccinic acid), "Aresklene 400" (Monsanto Chemical Co., dibutyl phenol sodium disulfonate), "MP-189S" (Du Pont Co., hydrocarbon sulfonate), etc.

It is likewise desirable to use an acid acceptor for the hydrogen halide which is liberated in the course of the reaction of the piperazine compound with the phthaloyl halide. The piperazine compound itself can serve as the acid acceptor by forming the amine salt. Since the amine salt is incapable of reacting with the diacid halide, it is desirable in this instance to start with at least 2 equivalents of the piperazine compound for every equivalent of diacid halide to ensure that all the diacid halide is used up. To circumvent the necessity for using this large excess of the piperazine compound, it is necessary merely to add an acid acceptor, preferably to the liquid phase containing the diamine. When the amount of added acid acceptor is equivalent to the amount of liberated hydrogen halide, none of the piperazine compound will be rendered unreactive. Larger amounts or lesser amounts of the added acid acceptor may be employed. The added acid acceptor may range from zero up to an amount equivalent to 15 times the piperazine compound present or even more. Preferably, the added acid acceptor, if one is used, will be in the range of 1 to 3 times the amount equivalent to the piperazine compound present. To be effective the added acid acceptor must be a stronger base than the piperazine compound contained in the same liquid phase so that the hydrogen halide preferentially reacts with the added acid acceptor. Depending on the basicity of the piperazine compound, the added acid acceptor may be caustic alkali, an alkali carbonate or other salt of a strong base and a weak acid or a tertiary organic base.

These basic materials may be added directly to one of the liquid phases or sometimes to both the liquid phases either before or during the course of the reaction. Or, if these basic materials are not added at this stage, they may be added to the spent reaction liquor as a means of reforming the piperazine compound from the piperazine hydrohalide, so that the piperazine compound may be put through the reaction again. As can be seen in the examples hereinafter set forth, the liquid phase containing the piperazine compound can be strongly alkaline and still not prevent the preferential reaction of the diacid halide with the piperazine compound.

The invention will now be further described in the following specific examples, which are to be regarded solely as illustrative, and not as restricting the scope of the invention.

Example I

A reaction mixture is prepared as follows: To an ice-jacketed Waring Blendor jar are added 24 parts of an aqueous solution of sodium hydroxide, containing 4 parts of sodium hydroxide, 21 parts of an aqueous 5% solution of sodium lauryl sulfate, 6.5 parts of 2,5-dimethyl-piperazine, 150 parts of water, and 37.5 parts of chloroform. The sodium hydroxide is added to combine with free hydrogen chloride, liberated in the course of the reaction. To the stirred system is added all at once 10.2 parts of phthaloyl chloride in 37.5 parts of chloroform. The polymerization reaction takes place in the stirred emulsion practically immediately. The chloroform is then boiled off, and the polymer is isolated, washed to remove traces of contaminants, and dried. The polymer is obtained in an 80% yield as a white powder and it has an inherent viscosity of 1.66 in meta-cresol. The polymer stick temperature (the temperature at which a portion of the polymer, when drawn over a copper bar, leaves a trail) is 350° C. The polymer is soluble in chloroform, hot dimethylformamide, acetic acid, and 1,1,2-trichloroethane.

A clean viscous spinning dope is prepared from this polymer by dissolving it to the extent of 20% in a mixture of 12% methanol and 88% chloroform (by weight). The solution is spun through a spinneret with three 0.10 mm. holes into an air chamber held at an air temperature of 75° C. The yarn is wound up continuously, and then drawn to 1.6 times its original length over a pin heated to 90° C. The resulting drawn yarn has a tenacity of 1.1 grams/denier and can be elongated 15% before breakage. When the drawn yarn is boiled in water, its elongation is increased to 30%, while the tenacity drops only to 1.0 gram/denier. The drawn yarn shows outstandingly good work recovery and tensile recovery—the work recovery from 3% elongation is 87%, while the tensile recovery from 5% elongation is 94%. The comparable properties for the "boiled-off," i.e., boiled in water, yarns are even better, being 89% and 95% respectively.

Example II

In an experiment very similar to that described above, a polyamide is prepared from piperazine and phthaloyl chloride. Sodium carbonate is used as an acid acceptor instead of sodium hydroxide, and the acid chloride is added over a 40 second interval, instead of all at once. A polymer is obtained with an inherent viscosity of 1.56 measured in meta-cresol and a melt temperature of 325° C. The polymer is soluble in a mixture of 12% methanol and 88% chloroform, in hot 1,1,2-trichloroethane, in acetic acid, and in hot dimethylformamide.

The polyamide structures described herein are also useful in the form of copolymers, and as such they impart to the copolymer a large measure of the desirable solubility behavior of the pure polyphthalamides. This phenomenon is the more significant because the good physical properties of the pure polyphthalamides permit the preparation of copolymers with excellent strength and drawability.

Example III

To an ice-jacketed Waring Blendor jar are added 10.6 parts of sodium carbonate in 20 parts of water, 25 parts of a 5% aqueous solution of sodium lauryl sulfate, 4.6 parts of piperazine, 110 parts of water and 38 parts of chloroform. The ingredients are stirred to form an emulsion and a solution of 38 parts of chloroform containing 5.6 parts of phthaloyl chloride and 4.6 parts of terephthaloyl chloride is added all at once. The polymerization reaction takes place in the stirred emulsion and is complete after approximately 5 minutes. The chloroform is boiled off and the precipitated polymer is decanted onto a Büchner funnel where it is washed with cold water and dried. The polymer has an inherent viscosity of 1.5 in meta-cresol. A casting solution is prepared from this polymer by dissolving it to the extent of 15% in a mixture of 12% methanol and 88% chloroform (by weight). A film is cast from the solution. The film is tough and can be drawn to 3 times its original length.

Example IV

To an ice-jacketed Waring Blendor jar are added 4 parts of sodium hydroxide in 20 parts of water, 25 parts of a 5% aqueous solution of sodium lauryl sulfate, 6.0 parts of 2,5-dimethyl-piperazine, 110 parts of water and 38 parts of chloroform. The ingredients are stirred to form an emulsion and a solution of 38 parts of chloroform containing 6.1 parts of phthaloyl chloride and 4.1 parts of isophthaloyl chloride is added all at once. The polymerization reaction takes place in the stirred emulsion and is complete after approximately 10 minutes. The chloroform is boiled off and the precipitated polymer is decanted onto a Büchner funnel where it is washed with cold water and dried. The polymer has an inherent viscosity of 1.7 in meta-cresol. A casting solution is prepared from this polymer by dissolving it to the extent of 15% in a mixture of 12% methanol and 88% chloroform (by weight). A film is cast from the solution. The film is clear and flexible.

While the above examples illustrate specific embodiments of the invention, other polyphthalamides are also suitable. Among the piperazine compounds which can be used in the formation of the homopolymers are piperazine, 2-methyl piperazine, 2,3,5,6-tetramethyl piperazine, 2,5-dimethyl piperazine, 2,5-dibutyl piperazine, 2,5-diisobutyl piperazine, octamethyl piperazine and the various other C-lower alkyl substituted piperazines. In the preparation of copolymers, the phthalamide constituent can be used in conjunction with halides of other aromatic dicarboxylic acids such as isophthalic, terephthalic, bibenzoic and the larger ring structures. Aliphatic diacid halides such as adipic, suberic and sebacic can also be used in conjunction with a phthaloyl halide to form the soluble phthalamide copolymers. Bischloroformates derived from glycols and diphenols are also suitable coreactants. Moreover, two or more of the piperazine structures can be used together in the polymer or copolymer compositions as the foregoing suggests.

In all these compositions, the presence of at least 50% of the piperazine phthalamide linkages bestow on the polymer the features of solubility combined with high melting point so that the product is well suited for the formation of fibers, films and the like by the use of processes and equipment already well known in industrial use today.

Many modifications will be apparent to those skilled in the art from the reading of the above without a departure from the inventive concept.

I claim:

A process for preparing a polyamide which comprises bringing together (A) a piperazine compound of the formula

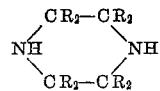

wherein R is selected from the group consisting of hydrogen and lower alkyl, in one aqueous liquid phase, and (B) an organic dicarboxylic acid halide containing a major amount of a phthaloyl halide in a second liquid phase immiscible with the first phase and comprising chloroform, mixing the liquid phases to form a system comprised of two liquid phases in the form of an emulsion of fine particle size such that the piperazine compound and acid halide are in separate phases and maintaining the phases in admixture until an interfacial condensation polymerization has taken place with the formation of a synthetic, linear, orientable, fiber-forming polyamide having an inherent viscosity of at least about 1.5 in meta-cresol.

References Cited in the file of this patent

UNITED STATES PATENTS

| | | |
|---|---|---|
| 2,071,250 | Carothers | Feb. 16, 1937 |
| 2,625,536 | Kirby | Jan. 17, 1953 |
| 2,708,617 | Magat et al. | May 17, 1955 |
| 2,813,775 | Steuber | Nov. 19, 1957 |
| 2,831,834 | Magat et al. | Apr. 22, 1958 |

FOREIGN PATENTS

| | | |
|---|---|---|
| 1,123,599 | France | June 11, 1956 |
| 880,537 | France | Jan. 4, 1943 |

OTHER REFERENCES

Flory et al.: J. Amer. Chem. Soc., vol. 73, 1951, pages 2532–2538.

Lieser et al.: Annalen der Chemie, vol. 556, 1944, pages 114, 115, 119.